United States Patent [19]
Dawson

[11] 3,856,905
[45] Dec. 24, 1974

[54] ORIENTED PLASTIC TUBE
[75] Inventor: David H. Dawson, Midland, Mich.
[73] Assignee: The Dow Chemical Company, Midland, Mich.
[22] Filed: Sept. 22, 1972
[21] Appl. No.: 291,288

[52] U.S. Cl. ............ 264/89, 264/93, 264/230, 264/269, 264/280, 264/DIG. 50, 264/DIG. 71
[51] Int. Cl. ............ B29c 17/07, B29d 23/03
[58] Field of Search ............ 264/230, 209, 269, 88, 264/89, 93, 94, 210 R, 280, DIG. 71, DIG. 50

[56] References Cited
UNITED STATES PATENTS

| | | | |
|---|---|---|---|
| 2,110,783 | 3/1938 | Welker | 264/DIG. 71 |
| 2,661,499 | 12/1953 | James, Jr. et al. | 264/209 |
| 3,050,786 | 8/1962 | St. John et al. | 264/230 |
| 3,249,671 | 5/1966 | Perrone et al. | 264/209 |
| 3,560,295 | 2/1971 | Kimbrell et al. | 264/89 |

Primary Examiner—Jeffery R. Thurlow
Attorney, Agent, or Firm—Robert B. Ingraham

[57] ABSTRACT

Thermoplastic tubing is prepared having radial orientation by deforming tube radially with little or no axial deformation. Such tubes are particularly useful for lining applications such as pipe.

7 Claims, 2 Drawing Figures

3,856,905

3,856,905

ORIENTED PLASTIC TUBE

A variety of methods have been employed for the lining of rigid pipe with various plastics in order to achieve chemical and/or abrasion resistance. Such methods have included insertion of a plastic or rubber liner into a rigid pipe or fitting, such as a steel pipe, and joining the liner to the pipe by means of adhesive. Other lined pipes have been prepared by stretching an elastomeric liner which is oversize to the pipe, pulling the liner into the pipe, releasing the axial tension on the liner, thereby permitting the liner to expand to an interference fit with the pipe. Other techniques include sliding a liner within a pipe, flanging the ends of the liner and maintaining the liner within the pipe section by means of its attachment to terminal flanges. Still another method of lining pipe is to provide a liner of a desired dimension, a malleable casing into which the liner will slide freely and swaging the casing to a smaller diameter which would tend to compress the liner. One of the more undesirable problems presented by a thermoplastic lined pipe is the tendency of the liner to become loose after temperature cycling under service conditions.

It would be desirable if there were available an improved plastic tube for the lining of pipe.

It would also be desirable if there were available an improved plastic tube and method for the preparation thereof which was suitable for lining cavities.

It would further be desirable if there were available an improved plastic tube for the lining of pipe which exhibited little or no tendency to change in length on exposure to heat.

These benefits and other advantages in accordance with the present invention are achieved in a method for the preparation of a conduit, the conduit having a plastic liner tube of a synthetic resinous thermoplastic composition, the method comprising plastically deforming the tube at a temperature above its glass temperature and a temperature below its softening point to radially compress the tube to a diameter smaller than its original diameter without substantially increasing the length of the tube; beneficially such a tube is then positioned within a suitable cavity to be lined, such as a pipe, warmed to a temperature slightly above the temperature above deformation and below the softening temperature, whereupon the tube radially expands to form a tight fitting lining.

Further features and advantages of the present invention will become more apparent from the following specification taken in connection with the drawing wherein.

Figure 1:
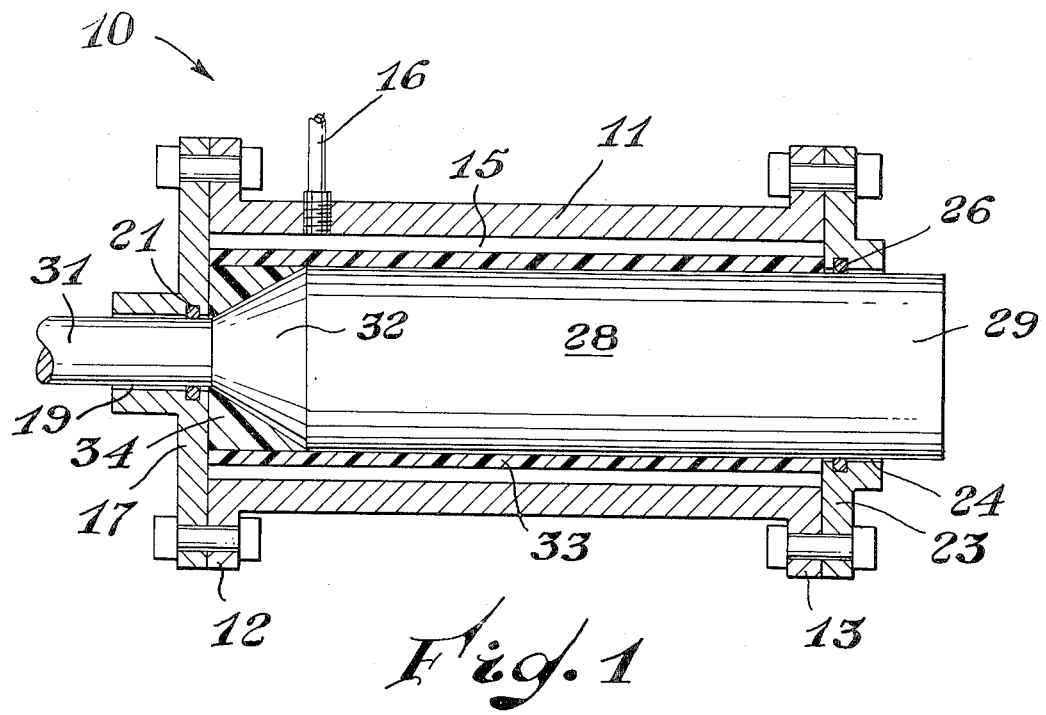
FIG. 1 depicts an apparatus suitable for practice of the present invention.

In FIG. 1 there is schematically depicted an apparatus generally designated by the reference numeral 10. The apparatus 10 comprises in cooperative combination a hollow pressure vessel 11 having a first flanged end 12 and a second flanged end 13. The vessel 11 defines therein a generally cylindrical cavity 15. A fluid supply means 16 passes through the vessel 11 and is in communication with the passage 15. A first end plate 17 is affixed to the first end 11 of the vessel 12 and is in sealing engagement therewith. The end plate 17 defines a passageway 19 generally coaxially disposed relative to the passageway 15. A sealing means 21 is disposed within the passageway 19. A second end plate 23 is affixed to the second end 13 of the vessel 11 and is in sealing engagement therewith. The end plate 23 defines a generally cylindrical opening or passage 24 disposed in generally coaxial relationship with the passage 15 of the vessel 11. A sealing means 26 is supported within the passage 24. A mandrel 28 is slidably positioned within the passage 15. The mandrel 28 has a large cylindrical portion 29, a small cylindrical portion 31. The portions 29 and 31 are coaxially disposed and are joined by means of a frustoconical section 32. The smaller portion 31 is slidably supported within the passage 19 of the first end plate 17 and is in sealing engagement with the sealing means or O-ring 21. The larger portion 29 is generally similarly disposed within the passageway 24 and is in sealing engagement with the sealing means or O-ring 26. Thus the mandrel 29 as shown in FIG. 1 can be slidably moved in such a manner that the larger portion 21 is to a large extent removed from the cavity 15 and replaced by the smaller portion 31. A synthetic resinous tube 33 having an annular deformable plug 34 adhered thereto is disposed within the cavity 15 and surrounds that portion of the mandrel 28 within the cavity 15.

In operation of the apparatus of FIG. 1, a tube having a length slightly longer than the passage 15 is positioned therein, the end plate 23 clamped in position, thereby providing fluid-tight seals at the end of the tube 33. Fluid pressure is subsequently applied to the cavity 15 from the fluid supply means 16. The tube 33 is thereby forced to conform to the outer configuration of the mandrel 28. The mandrel 28 is then withdrawn while more fluid under pressure is added to the passage 15. The plastic tube is thereby reduced in diameter until its inside diameter is generally equal to the diameter of the mandrel portion 31, with the exception of the region having the annular plug 34 which forms a bell on the end of the tube. The plug 34 is beneficially an elastomer such as natural or synthetic rubber and functions to prevent buckling and loss of the liquid-tight seal. Alternately, the end of the tube such as the tube 33 is molded prior to radial reduction to conform to the tubing portion of the mandrel and use of the plug is eliminated.

Figure 2:
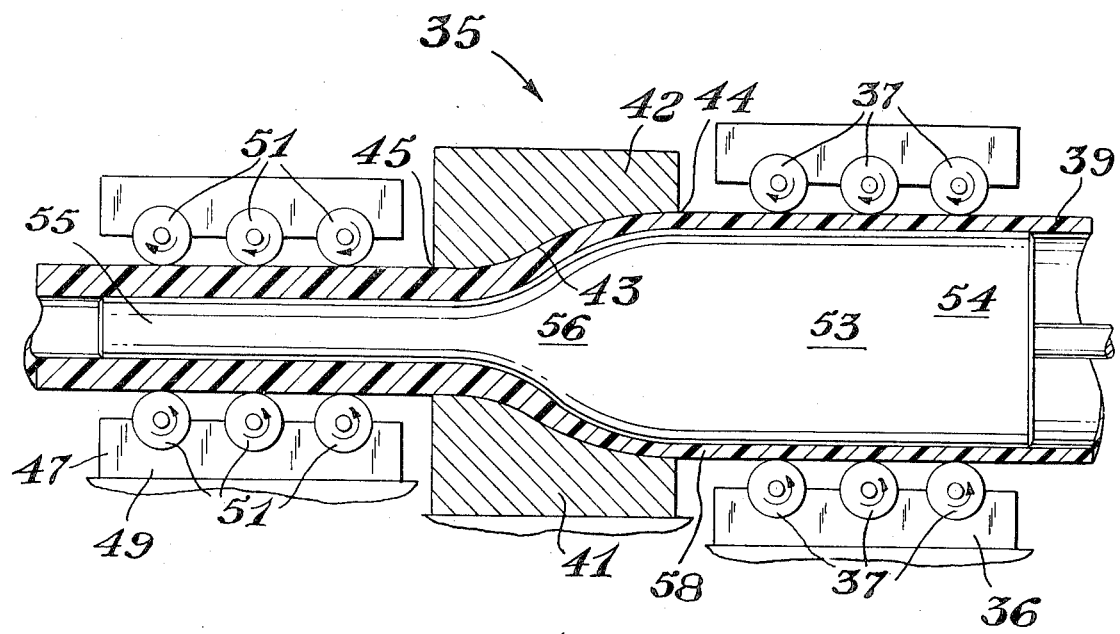
FIG. 2 depicts an alternate apparatus.

FIG. 2 depicts an alternate apparatus generally designated by the reference numeral 35 which induces radial orientation into a plastic tube. The apparatus 35 comprises in cooperative combination a tube supply and forwarding means 36 which beneficially is a plurality of driven rolls 37 which grip and forward a tube such as the tube 39 toward a swaging die 41. The swaging die 41 comprises a body 42 having defined therein a tapering passage 43, the passage 43 having a generally circular cross-section and having a major or inlet opening 44 and a minor or discharge opening 45. A tube takeaway means 49 is disposed adjacent the minor opening 45 of the swaging die 41. The takeaway means 49 has a plurality of driven rolls 51 adapted to engage tubing issuing from the discharge opening 435. A mandrel 53 is disposed between the rolls 37 of the supply means 36, extends through the swaging die 41 and into the takeaway means 49. The mandrel 53 has a major portion 54 within the supply means 36, a minor portion 55 within the takeaway means 49. The portions 54 and 55 are joined by a tapering portion 56 which generally conforms to the configuration of the passage 43. The mandrel optionally may be supported by a work piece such as the plastic tube 58 shown surrounding the mandrel 53.

In operation of the apparatus of FIG. 2, a length of plastic tubing of appropriate diameter is provided. The mandrel such as the mandrel 53 is inserted therein and the tube inserted into the supply means 56. The tube is then forced into the die 43 and caused to conform to the cross-sectional configuration of the die and the mandrel at the location of the minor opening 45 of the die 41. The rolls 37 forward the tube to the die and the rolls 51 are maintained beneficially at the same surface speed as the rolls 37 and prevent elongation of the tube. It is very desirable that the length of the tube before and after processing be generally unchanged. Beneficially when initially placing a plastic tube in the die it is frequently advantageous to form a number of elongate V-slots in the end which enters the die, and by proper orientation use can be made of both rolls 37 and 51.

A wide variety of thermoplastic resinous compositions are useful in the practice of the present invention including polyperfluorocarbons such as polytetrafluoroethylene, polychlorotrifluoroethylene; polyhalohydrocarbons such as polyvinylfluoride; vinylidene chloride polymers such as sarans, vinylidene chloride/ethyl acrylate copolymers; polyvinyl chloride; polyolefins such as polypropylene, polyethylene, resinous polymers of ethylene and propylene; nylon 6, nylon 66, nylon 7 and the like; alkenyl aromatic polymers including styrene polymers such as rubber-modified polystyrene, styrene/acrylonitrile; polyethers such as polymers of 2,2-bis(chloromethyl)oxacyclobutane and the like.

The essential characteristic of the lining to be operable in the present process is that it be deformable at a temperature below its softening temperature; that is, capable of viscoelastic deformation at a temperature between the glass temperature and the softening temperature. This phenomenon is found in most of the materials referred to as plastics which have not been crosslinked to a point where heat softening can no longer occur.

As the flow phenomenon is temperature and time dependent, more rapid sizing or reduction of the liner may be done at temperatures near the softening temperature, whereas the same amount of deformation may be induced in the liner at a temperature slightly above the glass temperature over a much longer period of time. The recovery or expansion of the compressed liner similarly is time dependent, longer times being required as the temperature approaches the glass temperature and shorter time periods required as the temperature approaches the softening temperature.

With many synthetic resins, the glass temperature is below normal ambient temperature and the softening temperature is well above ambient temperature. Some plastics of this nature are some saran compositions, rubber-modified polystyrene, the so-called "impact" grade polystyrene, polypropylene, polytetrafluoroethylene, resinous polymers of ethylene and propylene, nylon 66, etc.

Oftentimes, compression of the tube is readily obtained at room temperature and when the tube is positioned within the rigid outer casing, gentle warming will cause accelerated expansion to provide a tightly lined conduit.

Generally the choice of the fluid employed to deform the tube is not critical, however it generally is desirable that the fluid be a non-solvent and non-reactive with the tube being deformed under conditions of deformation. Water, ethylene glycol, mineral oil, air or nitrogen are fluids which are most generally useful.

By way of further illustration, a portion of polyethylene tube is obtained having an outside diameter of 1.5 inches, an inside diameter of one inch and a length of 6.25 inches. A 0.5 inch diamter mandrel is inserted in the tube. A washer is placed at each end of the tube and the washers positioned immediately adjacent the ends of the tube. A strip of stainless steel sheet is wound about the tube and a worm drive hose clamp or contractable loop is placed over the stainless steel strip, the hose clamp tightened slowly until the inner surface of the tubing contacts the mandrel. The compression is done at a temperature of about 100° C. and the assembly cooled to room temperature. The mandrel, restraining washers, clamp and steel strip are removed. The resultant pipe is measured and has an outside diameter of 1.30 inches and an inside diameter of 0.5 inch. The length is 0.645 inch. Minor buckling occurs apparently due to the buckling of the stainless steel strip. The compressed sample is then placed in boiling water at ambient pressure and heated until relaxation appears complete. The relaxed sample has an outside diameter of 1.44 inches and an inside diameter of 0.88 inch; the length reading is unchanged.

As is apparent from the foregoing specification, the present invention is susceptible of being embodied with various alterations and modifications which may differ particularly from those that have been described in the preceding specification and description. For this reason, it is to be fully understood that all of the foregoing is intended to be merely illustrative and is not to be construed or interpreted as being restrictive or otherwise limiting of the present invention, excepting as it is set forth and defined in the hereto-appended claims.

What is claimed is:

1. A method for the preparation of a conduit, the conduit having a plastic liner tube and an outer housing having a liner receiving cavity, the plastic liner tube being of a synthetic thermoplastic composition, the method comprising plastically deforming the tube at a temperature above its glass temperature and a temperature below its softening point to radially compress the tube to a diameter smaller than its original diameter without increasing the length of the tube, reducing the temperature of the tube below the temperature at which it was deformed, positioning the tube within an outer housing in a tube receiving cavity, and heating the tube to a temperature above the temperature of plastic deformatin and below its softening point to cause radial expansion of the tube within the cavity.

2. The method of claim 1 wherein the outer housing is a pipe.

3. The method of claim 1 wherein the plastic liner tube is deformed by the application of external fluid pressure.

4. The method of claim 3 wherein the fluid pressure is provided by a liquid.

5. The method of claim 3 wherein the liner tube is plastically deformed by disposing the liner tube within a pressure tight container having an elongate cavity therein and a mandrel within the cavity and the liner, the mandrel having a region of greater diameter and a region of lesser diameter, the liner tube being deformed about the mandrel as the portion of greater diameter is withdrawn from the cavity and the portion of lesser diameter moved into the cavity.

6. The method of claim 1 wherein the liner tube is plastically deformed by forcing the liner tube through a tapering die.

7. The method of claim 6 including the step of providing a tapering mandrel within the die and tube and deforming the tube about the mandrel.

* * * * *